United States Patent [19]
Johnson et al.

[11] Patent Number: 5,986,883
[45] Date of Patent: Nov. 16, 1999

[54] APPARATUS FOR COOLING CENTRAL PROCESSING UNITS IN PERSONAL COMPUTERS

[75] Inventors: Greg Johnson, Boise; Travis Schaff, Meridian, both of Id.

[73] Assignee: Micron Electronics, Inc., Nampa, Id.

[21] Appl. No.: 08/964,619

[22] Filed: Nov. 5, 1997

[51] Int. Cl.⁶ ..................................................... H05K 7/20
[52] U.S. Cl. ............................................ 361/695; 361/825
[58] Field of Search ................................... 361/687–688, 361/694–697, 825

[56] References Cited

U.S. PATENT DOCUMENTS 5,694,294  12/1997  Ohashi et al. .......................... 361/687
5,793,610   8/1998  Schmitt et al. ......................... 361/695

*Primary Examiner*—Gregory Thompson
*Attorney, Agent, or Firm*—Paul T. Parker

[57] ABSTRACT

A computer and a cooling unit for cooling a computer having a housing with a first panel including an aperture, a central processing unit coupled to a circuit board, a heat exchanger coupled to the central processing unit, and a power supply positioned apart from the heat exchanger. The heat exchanger is positioned internally in the housing, and it is obstructed from the aperture in the first panel. In one particular embodiment, the cooling unit has a separate support element segregated from the power supply and an airflow director attached to the support element. The support element, for example, may have a first section attached to either the housing, the motherboard, or another component of the computer apart from the central processing unit. The support element may also have a second section extending from the first section to an airflow site proximate to the heat exchanger. The airflow director may be a fan or conduit with an air-stream output at the airflow site to direct an air-stream across the heat exchanger.

39 Claims, 8 Drawing Sheets

APPARATUS FOR COOLING CENTRAL PROCESSING UNITS IN PERSONAL COMPUTERS

TECHNICAL FIELD

The present invention relates to personal computers, and more specifically, an embodiment of the present invention relates to cooling single-edge-contact central processing units in personal computers.

BACKGROUND OF THE INVENTION

Personal computers (PCs) are used extensively in many scientific, business, government, entertainment and other types of applications. The computing power of PCs, whether coupled to a network or operating as a stand-alone device, continually increases as faster, more powerful central processing units (CPUs) are produced. Additionally, the capacity and speed of memory devices, disk drives, compact disk read-only memories and other components have also increased. As CPUs become faster and more powerful, they also produce more heat than earlier generations of slower processors. Therefore, more powerful PCs with Pentium® or Pentium II® processors generally have active cooling systems to dissipate heat from the CPUs.

Conventional active cooling systems in computers are typically fans or thermoelectric heat pumps that draw heat away from the CPUs. FIG. 1A, for example, is a schematic top plan view of an interior portion of an existing desk-top computer 10a with a housing 12a having a plurality of panels. The housing 12a typically has a front panel 14a, a rear panel 15a, side panels 16a and a bottom panel 18. The computer 10a also has a motherboard 20a proximate to the rear panel 15a, a plurality of drive bays 30 proximate to the front panel 14a, and a power supply unit 40 mounted to the rear panel 15a. The motherboard 20a is a printed circuit assembly for operatively interconnecting arrays of plug-in electronic modules and other components. The motherboard 20a typically carries a flat-mounted CPU 22 proximate to an aperture 19 in the rear panel 15a, a plurality of memory modules 24 near the CPU 22, a plurality of card slots 26 near the memory modules 24 and several other components. Typical flat-mounted CPUs are the Pentium® or "86" series processors manufactured by Intel Corporation of California. To dissipate heat from the CPU 22, a fan 50 may be attached to the rear panel 15a at the aperture 19 to blow an air-stream across a heat exchanger 23 of the CPU 22. Alternatively, the fan 50 may be attached directly to the CPU 22 (not shown).

FIG. 1B is a schematic side elevational view of an existing tower computer 10b with a tower housing 12b. In this embodiment, a motherboard 20b is attached to the housing 12b at a rear panel 15b, the drive bays 30 are attached to the housing 12b at a top panel 17, and the power supply unit 40 is attached to the rear panel 15b proximate to the CPU 22. Again, the CPU 22 is a Pentium® processor or other type of flat-mounted unit. In this embodiment, the fan 50 is attached to the power supply unit 40 adjacent to the heat exchanger 23 to drive an air-stream across the heat exchanger 23.

Because computer designs continually change, on manufacturing concern in assembling computers is the cost to implement a new device. Several prominent computer manufacturers are custom order manufacturers that individually assemble each computer to a specific order. Custom order manufacturers accordingly maintain large inventories of CPUs, motherboards, memory modules, drives, power supply units and other individual components to quickly assemble the individual computers. However, when a new or upgraded version of a component is implemented, it may not be physically compatible with the other components in the inventory. As such, if a new, incompatible component is critical to being competitive, custom computer manufacturers may need to replace many existing components in their inventory to accommodate the new component.

One particularly important new component in the computer industry is the Pentium II® CPU manufactured by Intel Corporation. Referring again to FIG. 1B, a Pentium II CPU 122 is shown in phantom where it would be located in the tower housing 12b. The Pentium II CPU 122 is a single-edge-contact processor that projects away from the motherboard, and the Pentium II CPU 122 has a heat exchanger 123 (also shown in phantom) facing the center of the housing 12b. The Pentium II CPU 122 accordingly obstructs the heat exchanger 123 from the aperture 19 in the rear panel 15b. Moreover, to accommodate the Pentium II CPU 122, the power supply unit 40 is mounted apart from the motherboard 120 toward the top panel 17. As a result, a fan positioned on the power supply unit 40 or in the aperture 19 through the rear panel 15b may not adequately cool the Pentium II CPU 122 in the housing 12b. Computer manufacturers, therefore, typically need to redesign the component lay-out in the computers and/or provide new housings to implement the new Pentium II CPUs.

The cost of making new housings and/or redesigning the lay-out of components to accommodate the single-edge-contact Pentium II CPUs, however, may significantly impact the profitability of assembling computers with Pentium II processors. Moreover, it is equally difficult and expensive to upgrade an existing computer to accommodate a Pentium II processor. Therefore, implementing Pentium II CPUs in existing housings creates several challenges in custom computer manufacturing and other applications.

SUMMARY OF THE INVENTION

An embodiment of the present invention is a cooling unit for use in a computer having a housing with a first panel including an aperture, a central processing unit coupled to a circuit board, a heat exchanger coupled to the central processing unit, and a power supply positioned apart from the heat exchanger. The heat exchanger is positioned internally in the housing, and it is obstructed from the aperture in the first panel. In one particular embodiment, the cooling unit has a separate support element segregated from the power supply and an airflow director attached to the support element. The support element may have a first section attached to either the housing, the motherboard or another component of the computer. The support element may also have a second section extending from the first section to an airflow site proximate to the heat exchanger. The airflow director may accordingly have an air-stream output at the airflow site to direct an air-stream across the heat exchanger for cooling the CPU.

In one particular embodiment, the support element comprises a bracket having a first flange defining the first section and a second flange defining the second section. The first flange may have an opening, and the first flange may be attached to the first panel to align the opening with the aperture in the first panel. The airflow director may be a blower attached to the second flange at the airflow site, and the blower may have a moving blade defining the air-stream output. As such, the blower is positioned proximate to the heat exchanger to drive an air-stream across the heat exchanger.

In another embodiment, the airflow director may be a conduit attached to the flange. The conduit may have an inlet proximate to the aperture in the first panel and an outlet at the airflow site defining the air-stream output. The conduit accordingly may direct external air through the housing and across the heat exchanger.

In still another embodiment, the support element is a bracket having a first flange at an opening over the aperture in the first panel and a second flange extending from the first flange. In this embodiment, the second flange has a hole at the airflow site directed towards the heat exchanger, and the airflow director is a blower attached to the second flange at the airflow site to drive air through the hole in the second flange and across the heat exchanger. This embodiment of the cooling unit is particularly useful for adapting an existing tower housing for a flat-mounted CPU to accommodate a single-edge-contact CPU.

DETAILED DESCRIPTION OF THE INVENTION

The present invention is directed toward computers, cooling units for computers, and methods for cooling central processing units in computers. Many specific details of certain embodiments of the invention are set forth in the following description and in FIGS. 2–7 to provide a thorough understanding of such embodiments. One skilled in the art, however, will understand that the present invention may have additional embodiments and may be practiced without several of the details described in the following description or shown in FIGS. 2–7.

Figure 1A:
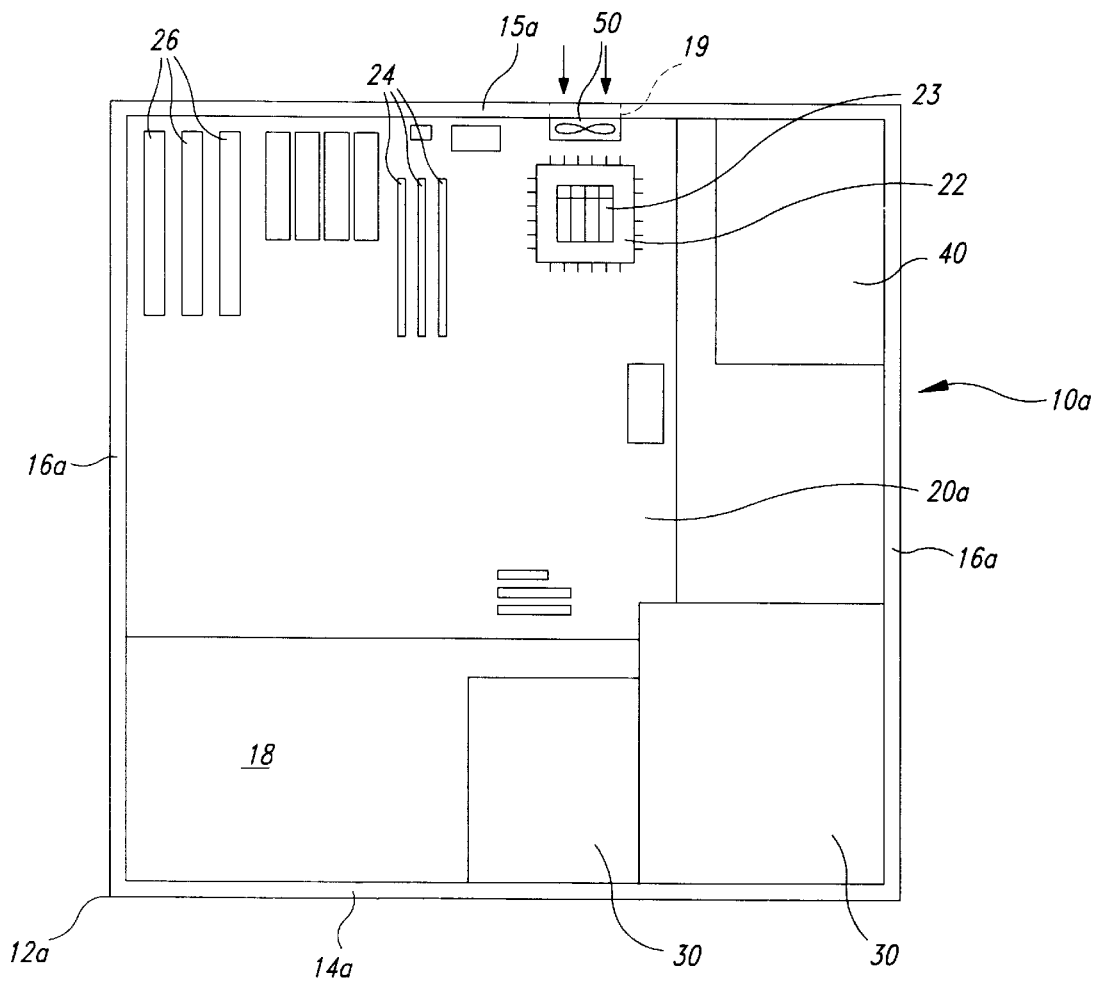
FIG. 1A is a schematic top plan view of an interior portion of a desk-top computer in accordance with the prior art.
Figure 1B:
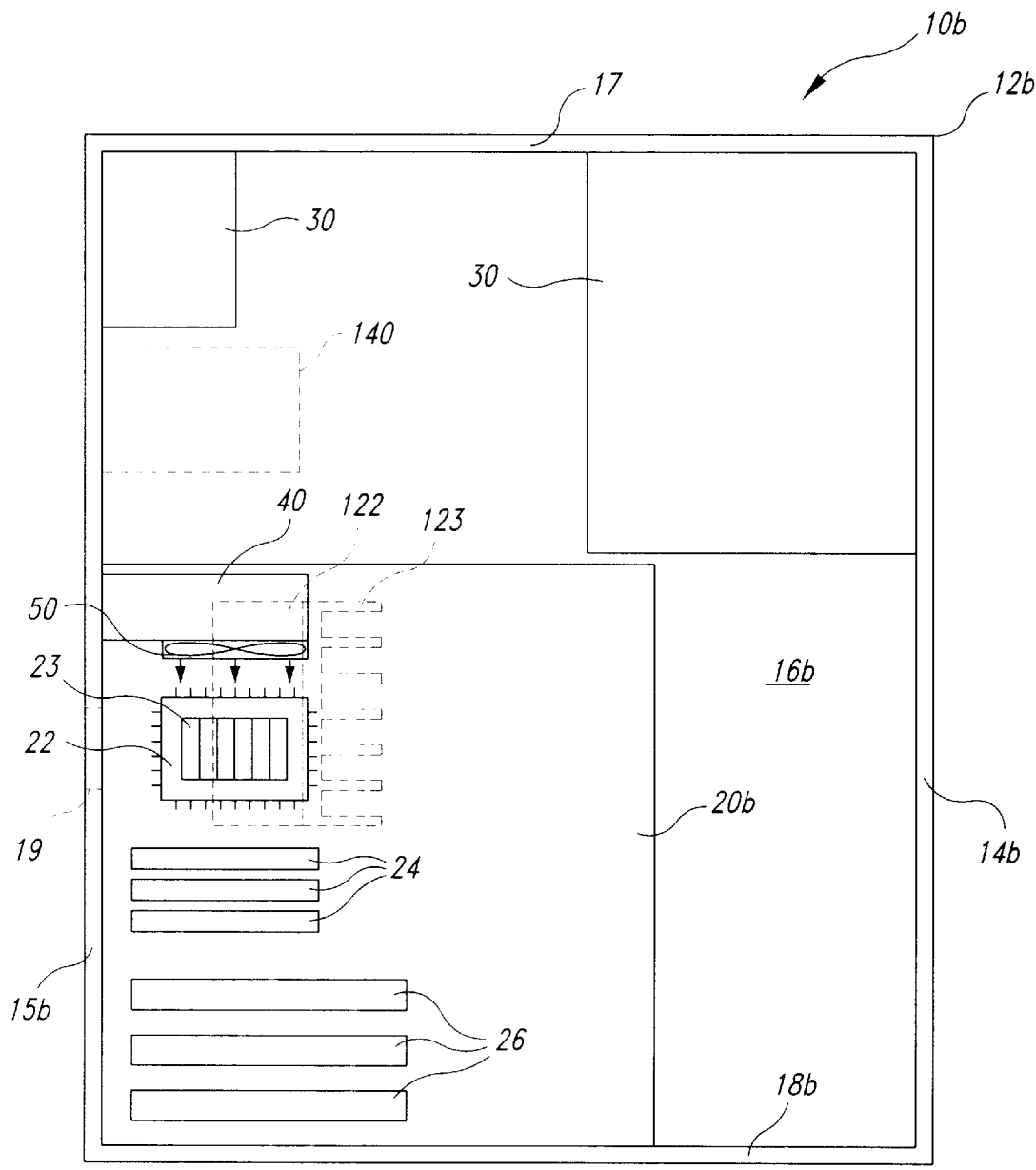
FIG. 1B is a schematic side elevational view of an internal portion of a tower computer in accordance with the prior art.
Figure 2:
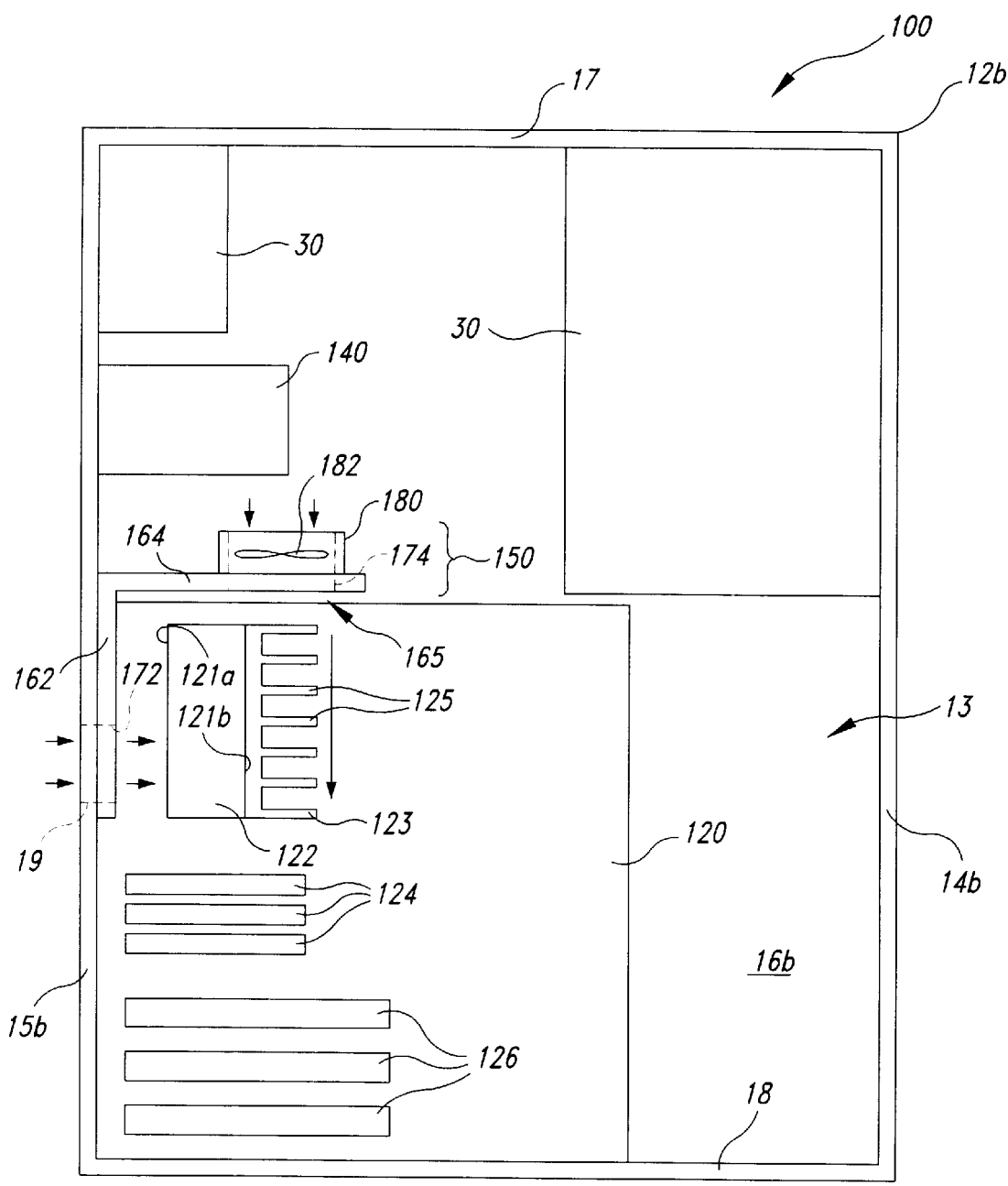
FIG. 2 is a schematic side elevational view of an internal portion of a tower computer and a cooling system in accordance with one embodiment of the invention.

FIG. 2 is a schematic side elevational view illustrating an internal portion of a tower computer 100 in accordance with one embodiment of the invention. As discussed above with respect to the tower computer 10b in FIG. 1-B, the computer 100 may use the same housing 12b with a front panel 14b, a rear panel 15b with an aperture 19, side panels 16b, a top panel 17 and a bottom panel 18. The panels of the housing 12b define a cavity 13 in which a plurality of drive bays 30 may be positioned at the front and rear corners of the top panel 17. The housing 12b also supports a printed circuit assembly or motherboard 120 in the cavity 13 at the rear panel 15b and the bottom panel 18. The motherboard 120 is positioned in the cavity 13 to rest on its bottom edge and extend vertically from the bottom panel 18.

The motherboard 120 carries a single-edge-connect CPU 122 having a first side 121a facing the rear panel 15b and a second side 121b facing an interior portion of the cavity 13. A heat exchanger 123 with a plurality of flanges 125 is attached to the second side 121b of the CPU 122. The CPU 122 and the heat exchanger 123 project substantially normal to the plane of the motherboard 120 to extend approximately horizontally within the cavity 13 of the housing 12b. The motherboard 120 also typically carries a plurality of memory modules 124, a plurality of card slots 126 and several other components to operate the computer 100. In addition to the motherboard 120 and the drive bays 30, a power supply unit 140 is attached to the rear panel 15b at a location significantly spaced apart from the motherboard 120 and the heat exchanger 123.

Figure 3:
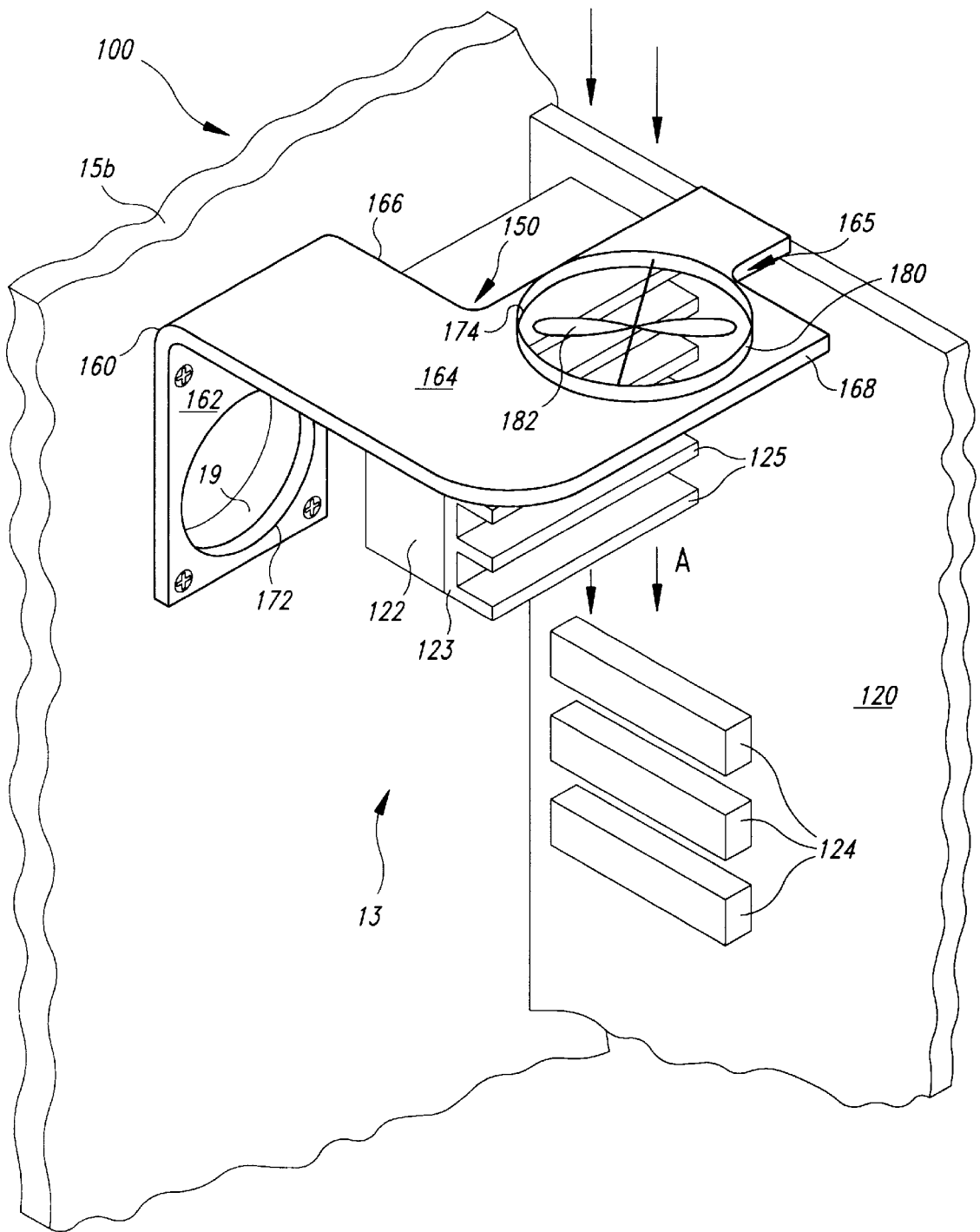
FIG. 3 is partial isometric view of the computer and the cooling system of FIG. 2.

FIG. 3 is a partial isometric view of the computer 100 illustrating a cooling unit 150 for adapting the housing 12b to accommodate the single-edge-connect CPU 122. Referring to FIGS. 2 and 3 together, the cooling unit 150 may have a support element 160 and an airflow director 180 mounted to the support element 160. The support element 160 is attached to a component of the computer, and it is configured to position the airflow director 180 proximate to the heat exchanger 123. The support element 160 may thus have a first section 162 attached to the rear panel 15b and a second section 164 extending from the first section 162 to an airflow site 165 proximate to the heat exchanger 123.

In one embodiment, the support element 160 is a bracket with a first flange defined by the first section 162 and a second flange defined by the second section 164. A first hole or opening 172 may pass through the first section 162 to expose the cavity 13 to the external environment via the aperture 19 in the rear panel 15b. Additionally, a second hole 174 may pass through the second section 164 at the airflow site 165. The second section 164 may also have a first segment 166 extending approximately normal to the first section 162 and a second segment 168 extending approximately normal to the first segment 166. Additionally, the first and second segments 166 and 168 may be coplanar.

The airflow director 180 may be a blower or fan attached to the second section 164 of the support element 160 at the hole 174. For example, the blower 180 may be a fan with a blade 182 defining an air-stream output that drives air through the hole 174 and across the flanges 125 of the heat exchanger 123 (arrows A). As described in more detail below, however, the airflow director may be a conduit or other type of device that directs an air-stream across the heat-exchanger 123.

The embodiment of the cooling unit 150 illustrated in FIGS. 2 and 3 adapts existing tower computer designs for flat-mounted CPUs to accommodate the new single-edge-contact CPUs. As explained above, the housings and component configurations for flat-mounted CPUs may not be suitable for single-edge-contact CPUs because the configuration of the CPU 122 and the heat exchanger 123 does not allow existing cooling systems to direct an air-stream across the heat exchanger 123. For example, the heat exchanger 123 is not only obstructed from the aperture 19 in the rear panel 15b, but it is also spaced apart and misaligned with respect to the power supply unit 140. To solve this problem, the cooling unit 150 adapts the housing 12b to accommodate the single-edge-contact CPU 122 by positioning the airflow director 180 where it can drive an air-stream across the flanges 125 of the heat exchanger 123. The cooling unit 150 accordingly eliminates the need to redesign and manufacture completely new housings for Pentium II based computers. Additionally, the cooling unit 150 allows existing computers to be upgraded to Pentium II CPUs.

Although the embodiment of the cooling unit 150 shown in FIGS. 2 and 3 is particularly useful for implementing Pentium II processors in existing tower PCs designed for existing flat-mounted processors, several other embodiments of cooling units with a support element and an airflow director may be used to adapt or otherwise reconfigure existing housings to accommodate other types of single-edge-contact components. For example, a portion of the airflow director 180 may be attached to the first section 162 of the support element 160 in addition to or instead of the second section 164. The cooling unit 150, accordingly, may have several other configurations that appropriately position an airflow director to direct an air-stream across the heat exchanger of a single-edge-contact CPU or other type of component.

Figure 4:
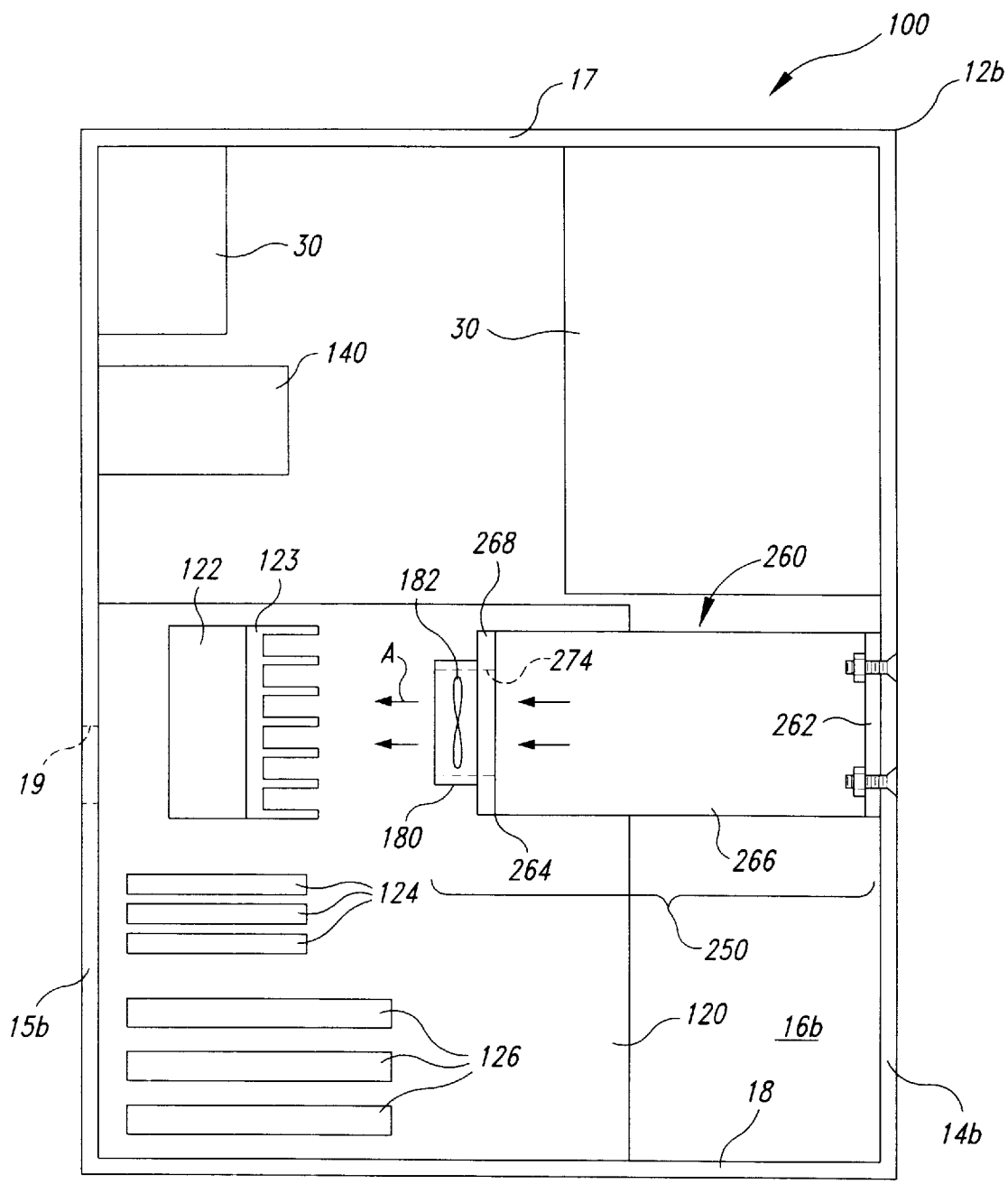
FIG. 4 is a schematic side elevational view of an internal portion of a computer and a cooling unit in accordance with another embodiment of the invention.
Figure 5:
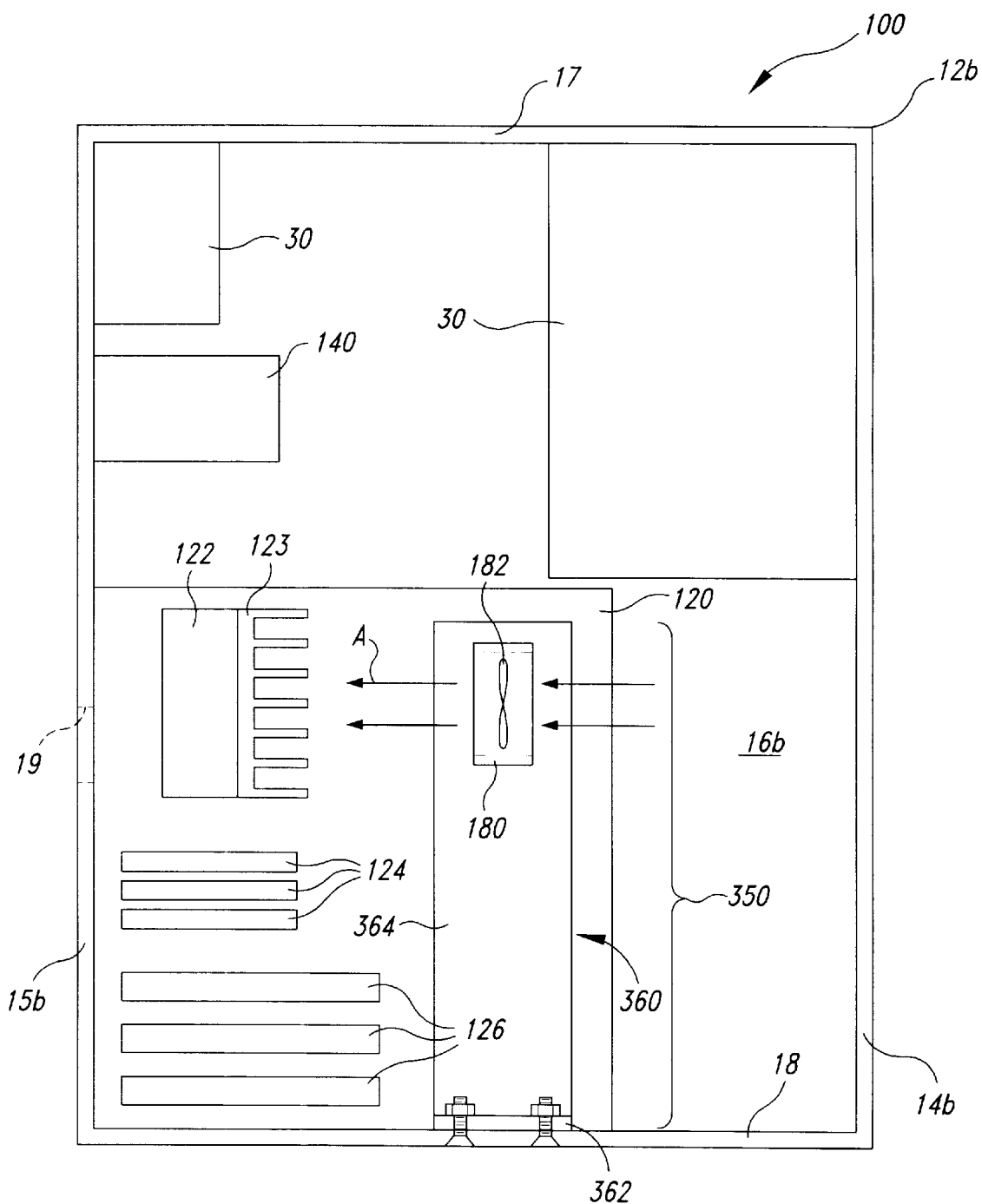
FIG. 5 is a schematic side elevational view of an internal portion of a computer and a cooling system in accordance with yet another embodiment of the invention.

FIGS. 4 and 5 are partial side elevational views illustrating an interior portion of the computer 100 with additional embodiments of cooling units. As discussed above with respect to FIGS. 2 and 3, the computer 100 has the housing 12b, the motherboard 120 with the single-edge-contact CPU 122 and the heat exchanger 123, the drive bays 30 and the power supply unit 140. Referring to FIG. 4, the computer 100 has another embodiment of a cooling unit 250 with a support element 260 attached to the front panel 14b. The support element 260 may have a first section 262 bolted to the front panel 14b and a second section 264 extending from the first section 262 toward the CPU 122. The second section 264, more specifically, may have a first segment 266 substantially normal to the first section 262 and a second segment 268 carrying an airflow director 180 facing the heat exchanger 123. The second segment 264 of the support element 260 may accordingly have a hole 274, and the airflow director 180 may be a blower with a fan blade 182 that moves an air-stream through the hole 274 and across the heat exchanger 123 (arrow A). Referring to FIG. 5, the computer 100 may have still another embodiment of a cooling unit 350 with a support element 360. The support element 360 may have a first section 362 bolted to the bottom panel 18 and a second section 364 extending from the first section 362 over the top of the motherboard 120. The airflow director 180 may be attached to the top of the second section 364 proximate to the heat exchanger 123 to direct an air-stream across the heat exchanger 123.

The support elements of the cooling units in accordance with the invention may be attached to several different components of the computer. As shown in FIGS. 2–5, for example, the support elements 160, 260 and 360 may be attached to various panels of the housing 12b. A support element may also be attached to the power supply 140 (not shown), the drive bays 30 (not shown) or other components of the computer 100 such that the second section of the support element extends to an airflow site proximate to the heat exchanger 123. Additionally, the support elements may be adapter modules or other types of mounting devices that appropriately position the airflow director 180 proximate to the heat exchanger 123.

Figure 6:
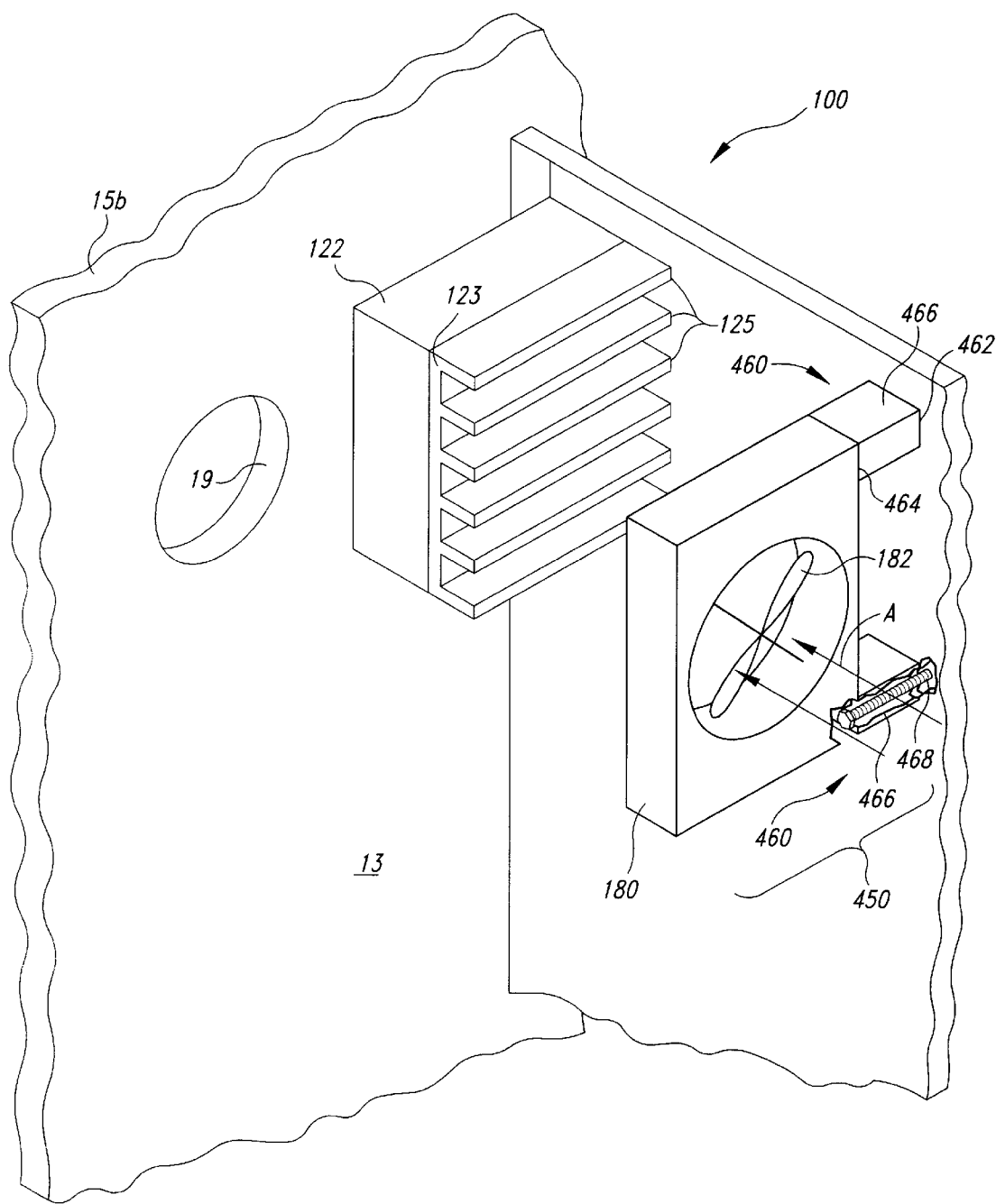
FIG. 6 is a partial isometric view of a computer and a cooling system in accordance with still another embodiment of the invention.

FIG. 6 is a partial isometric view of the computer 100 with yet another embodiment of a cooling system 450. In this embodiment, the cooling system 450 may have a support element 460 with a first section 462 attached to the motherboard and a second section 464 carrying the airflow director 180. As best shown by the cut-out portion of FIG. 6, the support element 460 may be a spacer or set-apart 466 with a hole (not shown) through which a bolt 468 passes. The bolt 468 accordingly attaches the airflow director 180 and the spacers 466 to the motherboard 120. In the embodiment shown in FIG. 6, the spacers 466 and bolts 468 are configured to be attached to dedicated set-apart locations on Intel Corporation's ATX specification motherboard. As such, the motherboard 120 does not need to be redesigned to accommodate the cooling unit 450 for applications directed toward Pentium II processors.

Figure 7:
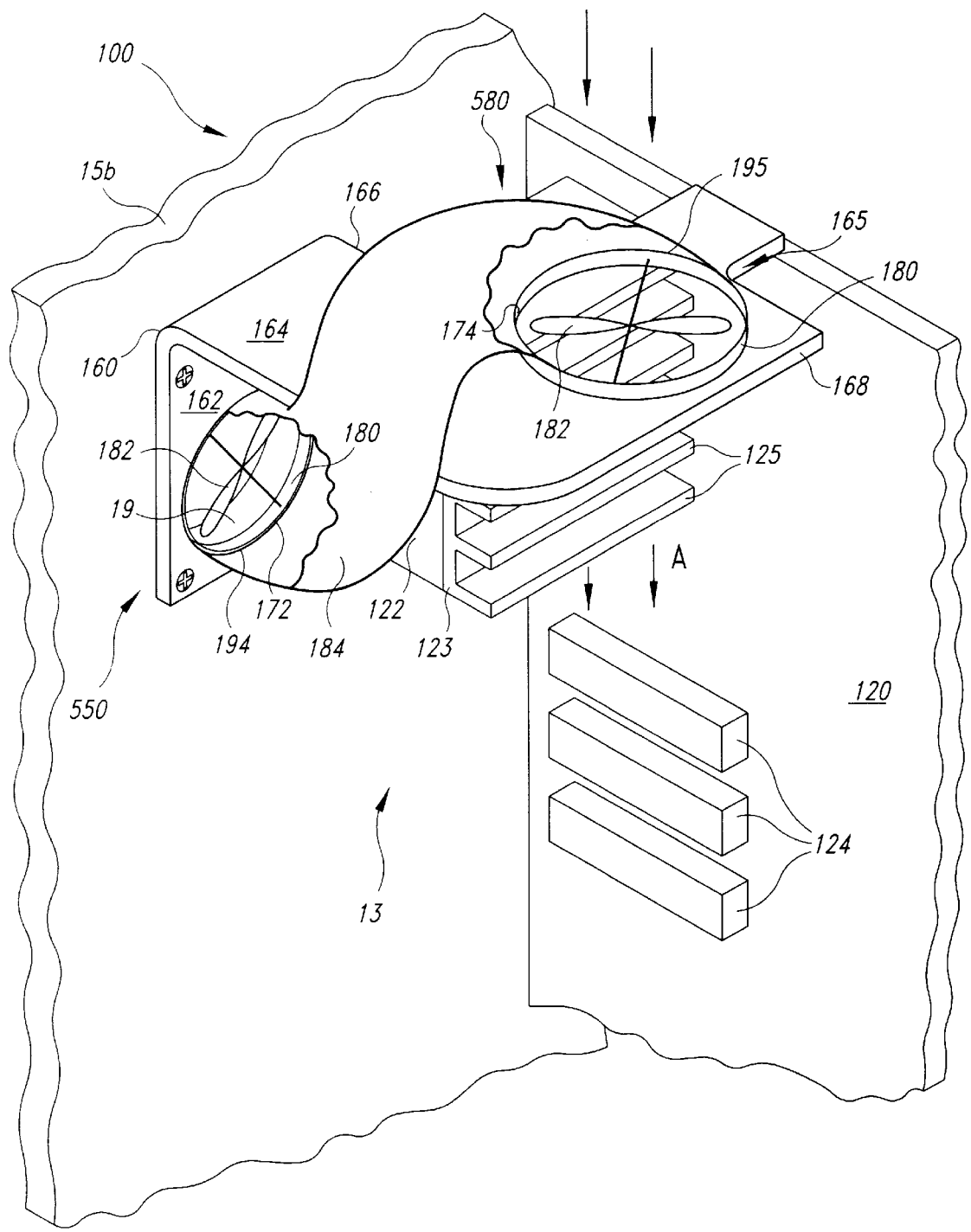
FIG. 7 is a partial isometric view of a computer and a cooling system in accordance with still another embodiment of the invention.

FIG. 7 is a partial isometric view of the computer 100 with another embodiment of a cooling unit 550. In this embodiment, the cooling unit 550 has the support element 160 described above with respect to FIGS. 2 and 3, and an airflow director 580 attached to the support element 160 to direct an air-stream across the heat exchanger 123. The airflow director 580 may have a conduit 184 with an inlet 194 attached to the first section 162 of the support element 160 at the first hole 172. The conduit 184 may also have an outlet 195 attached to the second section 164 of the support element 160 at the second hole 174. In addition to the conduit 184, the airflow director 580 may have a blower 180 attached to either the first section 162 of the support element 160 at the first hole 172 or the second section 164 at the second hole 174. The blower 180 accordingly drives air through the conduit 184 and across the heat exchanger 123.

From the foregoing it will be appreciated that, although specific embodiments of the invention have been described herein for purposes of illustration, various modifications may be made without deviating from the spirit and scope of the invention. For example, the first and second sections of the support element may define a base adapted to be attached to a component of the computer and a platform extending from the base to the airflow site. Additionally, the airflow director may be a ventilation system or another type of air-circulating system that generates an adequate air-stream to cool the CPU. Accordingly, the invention is not limited except as by the appended claims.

We claim:

1. In a computer having a housing with a first panel including an aperture, a central processing unit coupled to a printed circuit board, a heat exchanger coupled to the central processing unit internally in the housing at a location obstructed from the aperture in the first panel, and a power supply, a cooling unit comprising:

a separate support element segregated from the power supply, the support element having a first section attached to one of the housing and the printed circuit board, and the support element having a second section extending from the first section to an airflow site proximate to the heat exchanger; wherein the support element comprises a bracket having a first flange defining the first section and a second flange defining the second section, the first flange having an opening over the aperture in the first panel of the housing and the first flange being attached to the first panel; and an airflow director attached to the support element, the airflow director having an air-stream output at the airflow site to direct an air-stream across the heat exchanger, wherein the airflow director comprises a blower attached to the second flange at the airflow site, the blower having a moving blade defining the air-stream output.

2. In a computer having a housing with a first panel including an aperture, a central processing unit coupled to a printed circuit board, a heat exchanger coupled to the central processing unit internally in the housing at a location obstructed from the aperture in the first panel, and a power supply, a cooling unit comprising:

a separate support element segregated from the power supply, the support element having a first section attached to one of the housing and the printed circuit board, and the support element having a second section extending from the first section to an airflow site proximate to the heat exchanger, wherein the support element comprises a bracket having a first flange defining the first section and a second flange defining the second section, the first flange having an opening over the aperture in the first panel of the housing and the first flange being attached to the first panel; and an airflow director attached to the support element, the airflow director having an air-stream output at the airflow site to direct an air-stream across the heat exchanger, wherein the airflow director comprises a conduit attached to the flange, the conduit having an inlet proximate to the aperture in the first panel of the housing and an outlet at the airflow site defining the air-stream output, the conduit directing external air through the housing across the heat exchanger.

3. The cooling unit of claim 2 wherein the airflow director further comprises a blower at the aperture in the first panel to drive the air-stream through the conduit.

4. The cooling unit of claim 3 wherein the airflow director further comprises a blower at the airflow site to draw air through the conduit and drive the air-stream across the heat exchanger, the blower and the outlet of the conduit together defining the air-stream output.

5. In a computer having a housing with a first panel including an aperture, a central processing unit coupled to a printed circuit board, a heat exchanger coupled to the central processing unit internally in the housing at a location obstructed from the aperture in the first panel, and a power supply, a cooling unit comprising:

a separate support element segregated from the power supply, the support element having a first section attached to one of the housing and the printed circuit board, and the support element having a second section extending from the first section to an airflow site proximate to the heat exchanger, wherein the support element comprises a bracket having a first flange defining the first section and a second flange defining the second section, the first flange having an opening over the aperture the first in panel of the housing and the first flange being attached to the first panel, and the second flange having a hole at the airflow site directed towards the heat exchanger; and an airflow director attached to the support element, the airflow director having an air-stream output at the airflow site to direct an air-stream across the heat exchanger, wherein the airflow director comprises a blower attached to the second flange at the airflow site, the blower having a moving blade defining the air-stream output that moves air through the hole in the second flange and across the heat exchanger.

6. In a computer having a housing with a first panel including an aperture, a central processing unit coupled to a printed circuit board, a heat exchanger coupled to the central processing unit internally in the housing at a location obstructed from the aperture in the first panel, and a power supply, a cooling unit comprising:

a separate support element segregated from the power supply, the support element having a first section attached to one of the housing and the printed circuit board, and the support element having a second section extending from the first section to an airflow site proximate to the heat exchanger, wherein the support element comprises a bracket having a first flange defining the first section and a second flange defining the second section, the first flange having an opening over the aperture in the first panel of the housing and the first flange being attached to the first panel, and the second flange having a hole at the airflow site directed toward the heat exchanger; and an airflow director attached to the support element, the airflow director having an air-stream output at the airflow site to direct an air-stream across the heat exchanger, wherein the airflow director comprises a conduit attached to the flange, the conduit having an inlet proximate to the aperture in the first panel of the housing and an outlet at the airflow site defining the air-stream output, the conduit directing external air through the housing to the heat exchanger.

7. The cooling unit of claim 6 wherein the airflow director further comprises a blower at the aperture in the first panel to drive the air-stream through the conduit.

8. The cooling unit of claim 6 wherein the airflow director further comprises a blower at the airflow site to draw air through the conduit and drive the air-stream across the heat exchanger, the blower and the outlet of the conduit together defining the air-stream output.

9. In a computer having a housing with a first panel including an aperture, a central processing unit coupled to a printed circuit board, a heat exchanger coupled to the central processing unit internally in the housing at a location obstructed from the aperture in the first panel, and a power supply, a cooling unit comprising:

a separate support element segregated from the power supply, the support element having a first section attached to one of the housing and the printed circuit board, and the support element having a second section extending from the first section to an airflow site proximate to the heat exchanger, wherein the support element comprises a bracket having a first flange defining the first section and a second flange defining the second section, the first flange including an opening over the aperture in the first panel of the housing and the first flange being attached to the first panel, the second flange including a first segment extending approximately normally from the first flange, a second segment extending approximately normally to the first segment and in the plane of the first segment, and a hole in the second segment at the airflow site; and an airflow director attached to the support element, the airflow director having an air-stream output at the airflow site to direct an air-stream across the heat exchanger, wherein the airflow director comprises a blower mounted to the second segment, the blower having a moving blade defining the air-stream output to direct the airflow through the hole and across the heat exchanger.

10. In a computer having a housing with a first panel including an aperture, a central processing unit coupled to a motherboard, a heat exchanger coupled to the central processing unit internally within the housing at a location obstructed from the aperture in the first panel, and a power supply spaced apart from the heat exchanger, a cooling unit comprising:

an adapter separate from the power supply and the central processing unit, the adapter having a base attached to a component of the computer and a platform extending from the base to a site proximate to the central processing unit, wherein the adapter comprises a bracket having a first flange defining the base and a second flange defining the platform, the first flange having an opening over the aperture in the first panel of the housing and the first flange being attached to the first panel; and a ventilation system attached to the adapter, the ventilation system directing an air-stream within the housing across the heat exchanger, wherein the ventilation system comprises a blower attached to the second flange at the airflow site, the blower having a moving blade defining the air-stream output.

11. In a computer having a housing with a first panel including an aperture, a central processing unit coupled to a motherboard, a heat exchanger coupled to the central processing unit internally within the housing at a location obstructed from the aperture in the first panel, and a power supply spaced apart from the heat exchanger, a cooling unit comprising:

an adapter separate from the power supply and the central processing unit, the adapter having a base attached to a component of the computer and a platform extending from the base to a site proximate to the central processing unit, wherein the adapter comprises a bracket having a first flange defining the base and a second flange defining the platform, the first flange having an opening over the aperture in the first panel of the housing and the first flange being attached to the first panel; and a ventilation system attached to the adapter, the ventilation system directing an air-stream within the housing across the heat exchanger, wherein the ventilation system comprises a conduit attached to the flange, the conduit having an inlet proximate to the aperture in the first panel of the housing and an outlet at the airflow site defining the air-stream output, the conduit directing external air through the housing and across the heat exchanger.

12. The cooling unit of claim 11 wherein the ventilation system further comprises a blower at the aperture in the first panel to drive the air-stream through the conduit.

13. In a computer having a housing with a first panel including an aperture, a central processing unit coupled to a motherboard, a heat exchanger coupled to the central processing unit internally within the housing at a location obstructed from the aperture in the first panel, and a power supply spaced apart from the heat exchanger, a cooling unit comprising:

an adapter separate from the power supply and the central processing unit, the adapter having a base attached to a component of the computer and a platform extending from the base to a site proximate to the central processing unit, wherein the adapter comprises a bracket having a first flange defining the base and a second flange defining the platform, the first flange having an opening over the aperture in the first panel of the housing and the first flange being attached to the first panel, and the second flange having a hole at the airflow site directed toward the heat exchanger; and a ventilation system attached to the adapter, the ventilation system directing an air-stream within the housing across the heat exchanger, wherein the ventilation system comprises a blower attached to the second flange at the hole, the blower having a moving blade defining the air-stream output.

14. The cooling unit of claim 13 wherein the ventilation system further comprises a conduit, the conduit having an inlet proximate to the aperture in the first panel of the housing and an outlet at the airflow site, and wherein the blower drives the air-stream through the conduit and across the heat exchanger.

15. In a computer having a housing with a first panel including an aperture, a central processing unit coupled to a motherboard, a heat exchanger coupled to the central processing unit internally within the housing at a location obstructed from the aperture in the first panel, and a power supply spaced apart from the heat exchanger, a cooling unit comprising:

an adapter separate from the power supply and the central processing unit, the adapter having a base attached to a component of the computer and a platform extending from the base to a site proximate to the central processing unit, wherein the adapter comprises a bracket having a first flange defining the base and a second flange defining a platform, the first flange including an opening over the aperture in the first panel of the housing and the first flange being attached to the first panel, the second flange including a first segment extending approximately normally from the first flange, a second segment extending approximately normally to the first segment and in the plane of the first segment, and a hole in a second segment at the airflow site; and a ventilation system attached to the adapter, the ventilation system directing an air-stream within the housing across the heat exchanger, wherein the ventilation system comprises a blower mounted to the second segment, the blower having a moving blade defining the air-stream output to direct the airflow through the hole and across the heat exchanger.

16. In a computer having a housing with a first panel, a central processing unit coupled to a motherboard, a power supply, and a heat exchanger coupled to the central processing unit internally within the housing, the heat exchanger being obstructed from the first panel, a cooling unit comprising:

an adapter module having a first section attached to a component of the computer and a second section extending from the first section toward the heat exchanger, wherein the adapter module comprises a bracket having a first flange defining the first section and a second flange defining the second section, the first flange having an opening over the aperture in the first panel of the housing and the first flange being attached to the first panel; and an air circulating system attached to the second section of the adapter module, the adapter module and the circulating system being configured to direct an air-stream across the heat exchanger, and wherein the air-circulating system comprises a blower attached to the second flange at the airflow site, the blower having a moving blade defining the air-stream output.

17. In a computer having a housing with a first panel, a central processing unit coupled to a motherboard, a power supply, and a heat exchanger coupled to the central processing unit internally within the housing, the heat exchanger being obstructed from the first panel, a cooling unit comprising:

an adapter module having a first section attached to a component of the computer and a second section extending from the first section toward the heat exchanger, wherein the adapter module comprises a bracket having a first flange defining the first section and a second flange defining the second section, the first flange having an opening over the aperture in the first panel of the housing and the first flange being attached to the first panel; and an air circulating system attached to the second section of the adapter module, the adapter module and the circulating system being configured to direct an air-stream across the heat exchanger, and wherein the air-circulating system comprises a conduit attached to the flange, the conduit having an inlet proximate to the aperture in the first panel of the housing and an outlet at the airflow site defining the air-stream output, the conduit directing external air through the housing and across the heat exchanger.

18. The cooling unit of claim 17 wherein the air-circulating system further comprises a blower at the aperture in the first panel to drive the air-stream through the conduit.

19. In a computer having a housing with a first panel, a central processing unit coupled to a motherboard, a power supply, and a heat exchanger coupled to the central processing unit internally within the housing, the heat exchanger being obstructed from the first panel, a cooling unit comprising:

an adapter module having a first section attached to a component of the computer and a second section extending from the first section toward the heat exchanger, wherein the adapter module comprises a bracket having a first flange defining the first section and a second flange defining the second section, the first flange having an opening over the aperture in the first panel of the housing and the first flange being attached to the first panel, and the second flange having a hole at the airflow site directed toward the heat exchanger; and an air circulating system attached to the second section of the adapter module, the adapter module and the circulating system being configured to direct an air-stream across the heat exchanger, and wherein the air-circulating system comprises a blower attached to the second flange at the hole, the blower having a moving blade defining the air-stream output.

20. The cooling unit of claim 19 wherein the air-circulating system further comprises a conduit, the conduit having an inlet proximate to the aperture in the first panel of the housing and an outlet at the airflow site, and wherein blower drives the air-stream through the conduit and across the heat exchanger.

21. In a computer having a housing with a first panel, a central processing unit coupled to a motherboard, a power supply, and a heat exchanger coupled to the central processing unit internally within the housing, the heat exchanger being obstructed from the first panel, a cooling unit comprising:

an adapter module having a first section attached to a component of the computer and a second section extending from the first section toward the heat exchanger, wherein the adapter module comprises a bracket having a first flange defining the first section and a second flange defining a second section, the first flange including an opening over the aperture in the first panel of the housing and the first flange being attached to the first panel, the second flange including a first segment extending approximately normally from the first flange, a second segment extending approximately normally to the first segment and in the plane of the first segment, and a hole in a second segment at the airflow site; and an air circulating system attached to the second section of the adapter module, the adapter module and the circulating system being configured to direct an air-stream across the heat exchanger, and wherein the air-circulating system comprises a blower mounted to the second segment, the blower having a moving blade defining the air-stream output to direct the airflow through the hole and across the heat exchanger.

22. A computer, comprising:

a housing having a cavity defined by a plurality of panels including a first panel having an aperture;

a motherboard operatively installed in the cavity proximate to the first panel;

a central processing unit operatively coupled to the motherboard along a single edge, the central processing unit projecting normally from the motherboard at the single edge to have a first side facing the first panel and a second side facing away from the first panel;

a heat exchanger attached to the second side of the central processing unit facing away from the first panel;

a power supply unit operatively coupled to the central processing unit, the power supply unit being spaced apart from the heat exchanger;

a separate support element segregated from the power supply unit, the support element having a first section attached to one of the panels of the housing or the motherboard, and the support element having a second section extending from the first section to an airflow site proximate to the heat exchanger; and an airflow director attached to the support element, the airflow director having an air-stream output at the airflow site to direct an air-stream across the heat exchanger.

23. The computer of claim 22 wherein:

the support element comprises a bracket having a first flange defining the first section and a second flange defining the second section, the first flange having an opening over an aperture in the first panel of the housing and the first flange being attached to the first panel; and the airflow director comprises a blower attached to the second flange at the airflow site, the blower having a moving blade defining the air-stream output.

24. The computer of claim 22 wherein:

the support element comprises a bracket having a first flange defining the first section and a second flange defining the second section, the first flange having an opening over an aperture in the first panel of the housing and the first flange being attached to the first panel; and the airflow director comprises a conduit attached to the first and second flanges, the conduit having an inlet proximate to the aperture in the first panel of the housing and an outlet at the airflow site defining the air-stream output, the conduit directing external air through the housing across the heat exchanger.

25. The computer of claim 24 wherein the airflow director further comprises a blower at the aperture in the rear panel to drive the air-stream through the conduit.

26. The computer of claim 24 wherein the airflow director further comprises a blower at the airflow site to draw air through the conduit and drive the air-stream across the heat exchanger, the blower and the outlet of the conduit together defining the air-stream output.

27. The computer of claim 22 wherein:

the support element comprises a bracket having a first flange defining the first section and a second flange defining the second section, the first flange having an opening over an aperture the first in panel of the housing and the first flange being attached to the first panel, and the second flange having a hole at the airflow site directed towards the heat exchanger; and the airflow director comprises a blower attached to the second flange at the airflow site, the blower having a moving blade defining the air-stream output that moves air through the hole in the second flange and across the heat exchanger.

28. The computer of claim 22 wherein:

the support element comprises a bracket having a first flange defining the first section and a second flange defining the second section, the first flange having an opening over an aperture in the first panel of the housing and the first flange being attached to the first panel, and the second flange having a hole at the airflow site directed toward the heat exchanger; and the airflow director comprises a conduit attached to the first and second flanges, the conduit having an inlet proximate to the aperture in the first panel of the housing and an outlet at the airflow site defining the air-stream output, the conduit directing external air through the housing to the heat exchanger.

29. The computer of claim 28 wherein the airflow director further comprises a blower at the aperture in the first panel to drive the air-stream through the conduit.

30. The computer of claim 28 wherein the airflow director further comprises a blower at the airflow site to draw air through the conduit and drive the air-stream across the heat exchanger, the blower and the outlet of the conduit together defining the air-stream output.

31. The computer of claim 22 wherein:

the support element comprises a bracket having a first flange defining the first section and a second flange defining the second section, the first flange being attached to a panel of the housing and the second flange being configured to extend within the housing from the first flange to the airflow site proximate to the central processing unit; and the airflow director comprises a blower attached to the second flange at the airflow site, the blower having at least one moving blade defining the air-stream output.

32. The computer of claim 22 wherein:

the support element comprises a bracket having a first flange defining the first section and a second flange defining the second section, the first flange including an opening over an aperture in the first panel of the housing and the first flange being attached to the first panel, the second flange including a first segment extending approximately normally from the first flange, a second segment extending approximately normally to the first segment and in the plane of the first segment, and a hole in the second segment at the airflow site; and the airflow director comprises a blower mounted to the second segment, the blower having a moving blade defining the air-stream output to direct the airflow through the hole and across the heat exchanger.

33. A computer, comprising:

a housing having a cavity defined by a plurality of panels including a first panel having an aperture;

a motherboard operatively installed in the cavity proximate to the first panel;

a central processing unit operatively coupled to the motherboard along a single edge, the central processing unit having a first side projecting from the motherboard facing the first panel and a second side projecting from the motherboard facing away from the first panel;

a heat exchanger attached to the second side of the central processing unit and extending away from the first panel;

a power supply unit operatively coupled to the central processing unit, the power supply unit being spaced apart from the heat exchanger;

an adapter having a base attached to one of the panels of the housing or the motherboard and a platform extending from the base to a site proximate to the central processing unit; and a ventilation system attached to the adapter, the ventilation system directing an air-stream within the housing across the heat exchanger.

34. The computer of claim 33 wherein:

the adapter comprises a bracket having a first flange defining the base and a second flange defining the platform, the first flange having an opening over an aperture in the first panel of the housing and the first flange being attached to the first panel; and the ventilation system comprises a blower attached to the second flange at the airflow site, the blower having a moving blade defining the air-stream output.

35. The computer of claim 33 wherein:

the adapter comprises a bracket having a first flange defining the base and a second flange defining the platform, the first flange having an opening over an aperture in the first panel of the housing and the first flange being attached to the first panel; and the ventilation system comprises a conduit attached to the first and second flanges, the conduit having an inlet proximate to the aperture in the first panel of the housing and an outlet at the airflow site defining the air-stream output, the conduit directing external air through the housing across the heat exchanger.

36. The computer of claim 35 wherein the ventilation system further comprises a blower at the aperture in the first panel to drive the air-stream though the conduit.

37. The computer of claim 33 wherein:

the adapter comprises a bracket having a first flange defining the base and a second flange defining the platform, the first flange having an opening over an aperture in the first panel of the housing and the first flange being attached to the first panel, and the second flange having a hole at the airflow site directed toward the heat exchanger; and the ventilation system comprises a blower attached to the second flange at the hole, the blower having a moving blade defining the air-stream output.

38. The computer of claim 37 wherein the ventilation system further comprises a conduit, the conduit having an inlet proximate to the aperture in the first panel of the housing and an outlet at the airflow site, and wherein the blower drives the air-stream through the conduit and across the heat exchanger.

39. The computer of claim 33 wherein:

the adapter comprises a bracket having a first flange defining the base and a second flange defining the platform, the first flange including an opening over the aperture in the first panel of the housing and the first flange being attached to the first panel, the second flange including a first segment extending approximately normally from the first flange, a second segment extending approximately normally to the first segment and in the plane of the first segment, and a hole in a second segment at the airflow site; and the ventilation system comprises a blower mounted to the second segment, the blower having a moving blade defining the air-stream output to direct the airflow through the hole and across the heat exchanger.

* * * * *

UNITED STATES PATENT AND TRADEMARK OFFICE
CERTIFICATE OF CORRECTION

PATENT NO : 5,986,883
DATED : November 16, 1999
INVENTOR(S): Greg Johnson and Travis Schaff It is certified that error appears in the above-identified patent and that said Letters Patent is hereby corrected as shown below:

Claim 4, line 1

The cooling unit of claim 3 should be

--The cooling unit of claim 2--

Signed and Sealed this

Twenty-eighth Day of November, 2000

Attest:

Q. TODD DICKINSON

Attesting Officer      Director of Patents and Trademarks